(12) United States Patent
Miyahara et al.

(10) Patent No.: US 6,772,586 B2
(45) Date of Patent: Aug. 10, 2004

(54) METHOD OF DETECTING FAILURE OF HUMIDITY SENSOR

(75) Inventors: Yasuyuki Miyahara, Wako (JP); Kenichi Ohmori, Wako (JP); Norihito Watanabe, Wako (JP); Masao Komine, Wako (JP); Kenji Abe, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/310,945

(22) Filed: Dec. 6, 2002

(65) Prior Publication Data

US 2003/0106304 A1 Jun. 12, 2003

(30) Foreign Application Priority Data

Dec. 6, 2001 (JP) ........................................ 2001-372127

(51) Int. Cl.[7] .................................................. F01N 3/00
(52) U.S. Cl. ............................ 60/277; 60/274; 60/276; 60/297
(58) Field of Search ........................... 60/274, 276, 277, 60/297, 311; 73/29.01, 118.1

(56) References Cited

U.S. PATENT DOCUMENTS 6,422,006 B2 * 7/2002 Ohmori et al. ................ 60/297
6,477,830 B2 * 11/2002 Takakura et al. .............. 60/277
6,581,370 B2 * 6/2003 Ueno et al. .................... 60/277

FOREIGN PATENT DOCUMENTS

| JP | 05-256124 | * 10/1993 |
| JP | 07-285320 | * 10/1995 |
| JP | 10-239261 | * 9/1998 |
| JP | 2001-323811 | 11/2001 |

* cited by examiner

Primary Examiner—Tu M. Nguyen
(74) Attorney, Agent, or Firm—Armstrong, Kratz, Quintos, Hanson & Brooks, LLP (57) ABSTRACT

A humidity sensor is disposed near an HC adsorbent in an exhaust system of an internal combustion engine. After the internal combustion engine is shut off, it is detected whether or not the humidity sensor has failed based on the value of the humidity detected by the humidity sensor when the detected value of the humidity is substantially constant, by determining whether or not the detected value of the humidity falls in a range between upper and lower limit thresholds that are set depending on the temperature near the HC adsorbent. It is stably and easily detected whether or not the humidity sensor disposed near the HC adsorbent in the exhaust system of the internal combustion engine has failed.

8 Claims, 6 Drawing Sheets

METHOD OF DETECTING FAILURE OF HUMIDITY SENSOR

BACKGROUND OF THE INVENTION

1. Field of the Invention

The present invention relates to a method of detecting a failure of a humidity sensor that is disposed in the vicinity of a hydrocarbon adsorbent in the exhaust system of an internal combustion engine.

2. Description of the Related Art

Some known exhaust systems of internal combustion engines have an exhaust gas purifier disposed in the exhaust passage, which may comprise a hydrocarbon adsorbent such as zeolite or a hydrocarbon adsorption catalyst comprising a composite combination of a hydrocarbon adsorbent and a three-way catalyst, for adsorbing hydrocarbons (HC) in the exhaust gas while the catalytic converter such as a three-way catalyst or the like is not functioning sufficiently, i.e., while the catalytic converter is not sufficiently high in temperature and not activated as when the internal combustion engine starts to operate at a low temperature. The hydrocarbon adsorbent has a function to adsorb hydrocarbons in the exhaust gas at relatively low temperatures below 100° C., for example, and operates to release the adsorbed hydrocarbons when heated to a certain temperature in the range from 100 to 250° C., for example.

The applicant of the present application has attempted to evaluate a deteriorated state of the hydrocarbon adsorbent based on the output of a humidity sensor, which is disposed in the vicinity of the hydrocarbon adsorbent, e.g., downstream of the hydrocarbon adsorbent, under a certain operating condition of the internal combustion engine such as when the internal combustion engine is idling immediately after it has been started (see, for example, Japanese laid-open patent publication No. 2001-323811). The above evaluating technique is based on the fact that the hydrocarbon adsorbent has a property of adsorbing not only HC but also water contained in the exhaust gases emitted from the internal combustion engine, and the HC adsorbing ability (the maximum amount of HC that can be adsorbed) and the water adsorbing ability (the maximum amount of water that can be adsorbed) of the hydrocarbon adsorbent are highly correlated to each other. According to this evaluating process, the amount of water adsorbed by the hydrocarbon adsorbent is recognized based on the output of the humidity sensor, and the deteriorated state of the hydrocarbon adsorbent is evaluated based on the recognized amount of water adsorbed by the hydrocarbon adsorbent.

However, the above evaluating process fails to evaluate the deteriorated state of the hydrocarbon adsorbent in the event that the humidity sensor fails to operate. Therefore, it is desirous to have a technique on hand for detected whether or not the humidity sensor has suffered a failure i.e., whether or not the humidity sensor is normal.

One proposal is to detect whether or not the humidity sensor has suffered a failure based on the output of the humidity sensor in a certain operating state of the internal combustion engine. However, the internal combustion engines on automobiles operate in various operating states which tend to fluctuate with time or vary under various conditions. The internal combustion engines may not necessarily operate reliably in a certain operating state in which it is possible to detect whether or not the humidity sensor has suffered a failure. As the operating states of the internal combustion engines are liable to fluctuate with time, the output of the humidity sensor is subject to variations in the responsiveness thereof. It is thus generally difficult to detect whether or not the humidity sensor has suffered a failure in a certain operating state of the internal combustion engine.

SUMMARY OF THE INVENTION

It is therefore an object of the present invention to provide a method of detecting, stably and easily, a failure of a humidity sensor disposed in the vicinity of a hydrocarbon adsorbent in the exhaust system of an internal combustion engine.

According to the present invention, the humidity in the exhaust passage of an internal combustion engine near a hydrocarbon adsorbent disposed therein changes after the internal combustion engine is shut off, as follows: When the internal combustion engine is shut off after it has been normally operated continuously for a certain period of time, the humidity of the exhaust gas decreases as the hydrocarbon adsorbent adsorbs moisture in an exhaust gas remaining thereafter after the temperature of the hydrocarbon adsorbent has dropped to a temperature capable of adsorbing the moisture. When the adsorption of the moisture by the hydrocarbon adsorbent is saturated, the humidity near (around) the hydrocarbon adsorbent becomes substantially constant, or more specifically, its time-dependent changes are extremely small. The humidity which has become substantially constant near the hydrocarbon adsorbent changes depending on the deteriorated state of the hydrocarbon adsorbent, i.e., the humidity is higher as the deterioration of the hydrocarbon adsorbent progresses. If the humidity sensor is normal, however, the humidity falls in a certain range. Finally, because a gas exchange progresses between the exhaust passage and its exterior (generally, the gas exchange progresses very slowly), the humidity in the exhaust passage is converged to a humidity equivalent to the humidity outside of the exhaust passage.

A method of detecting a failure of a humidity sensor according to the present invention has been devised in view of the above phenomenon. According to the present invention, there is provided a method of detecting a failure of a humidity sensor in an exhaust system having a hydrocarbon adsorbent disposed in an exhaust passage of an internal combustion engine for adsorbing hydrocarbons contained in an exhaust gas emitted from the internal combustion engine, the humidity sensor being disposed in the exhaust passage for detecting a humidity in the exhaust passage near the hydrocarbon adsorbent, the method comprising the step of detecting whether or not the humidity sensor has failed based on an output signal of the humidity sensor within a predetermined period in which the output signal of the humidity sensor is substantially constant and a humidity represented by the output signal of the humidity sensor is not converged to a humidity outside of the exhaust passage, after the internal combustion engine is shut off.

The output signal from the humidity sensor in the predetermined period, which is used in detecting whether or not the humidity sensor has failed, corresponds to the humidity (detected humidity) near the hydrocarbon adsorbent when the humidity near (around) the hydrocarbon adsorbent is substantially constant and in a state before the humidity near (around) the hydrocarbon adsorbent is converted to the humidity outside of the exhaust passage after the internal combustion engine is shut off (such a state will hereafter be referred to occasionally as "steady humidity state"). Because the hydrocarbon adsorbent and the state of the exhaust gas around the humidity sensor near the hydrocarbon adsorbent are substantially static (steady) in the predetermined period as the internal combustion engine is shut off, the output signal from the humidity sensor in the predetermined period is highly stable. Because the output signal from the humidity sensor in the predetermined period depends on the steady humidity, it is not affected by variations in the responsiveness of the humidity sensor. Accordingly, it is possible to detect stably and easily whether or not the humidity sensor has failed based on the output signal from the humidity sensor within the predetermined period.

According to the present invention, the predetermined period comprises, for example, a period after a lapse of a predetermined time at least after the internal combustion engine is shut off. Specifically, until the hydrocarbon adsorbent adsorbs moisture therearound and is saturated, i.e., until the steady humidity state is initiated, after the internal combustion engine is shut off, a certain period of time (two to four hours for the exhaust system of an automobile) is needed. According to the present invention, it is detected whether or not the humidity sensor has failed based on the output signal from the humidity sensor after elapse of the predetermined time. This allows the output signal from the humidity sensor, which is appropriate for detecting whether or not the humidity sensor has failed, to be easily obtained without the need for monitoring the output signal from the humidity sensor frequently.

According to the present invention, the predetermined period comprises a period after at least a temperature close to the hydrocarbon adsorbent is substantially equal to a temperature outside of the exhaust passage. Specifically, after the internal combustion engine is shut off, the temperature near the hydrocarbon adsorbent drops and is finally converged to a temperature substantially equal to the temperature outside of the exhaust passage. When the temperature near the hydrocarbon adsorbent is substantially equal to the temperature outside of the exhaust passage, because the saturated water vapor pressure near the hydrocarbon adsorbent is substantially constant, the humidity near the hydrocarbon adsorbent is also substantially constant. Accordingly, if the predetermined period comprises the period after the temperature close to the hydrocarbon adsorbent is substantially equal to the temperature outside of the exhaust passage, then it is possible to obtain the output signal of the humidity sensor which is appropriate for detecting whether or not the humidity sensor has failed.

According to the present invention, the predetermined period terminates when a predetermined time elapses after the internal combustion engine is shut off. Specifically, after the internal combustion engine is shut off, the humidity near the hydrocarbon adsorbent is finally converged to the humidity substantially equal to the humidity outside of the exhaust passage, as described above. Consequently, the predetermined period is selected to terminate when the predetermined time elapses after the internal combustion engine is shut off, and it is detected whether or not the humidity sensor has failed based on the output signal from the humidity sensor prior to the time when the predetermined time elapses. It is thus possible to obtain the output signal of the humidity sensor which is appropriate for detecting whether or not the humidity sensor has failed. The predetermined time referred to above is a time (24 to 72 hours for the exhaust system of an automobile) sufficiently longer than the time when the steady humidity state is initiated after the internal combustion engine is shut off.

According to the present invention, it is detected whether or not the humidity sensor has failed based on the output signal from the humidity sensor after the internal combustion engine is shut off at least under predetermined operating conditions. This allows a state of the exhaust gas (the humidity of the exhaust gas, or the like) in the exhaust passage after the internal combustion engine is shut off to be kept optimum in detecting whether or not the humidity sensor has failed. Therefore, the reliability of the process of detecting whether or not the humidity sensor has failed can be increased.

More specifically, the predetermined operating conditions should preferably include a condition relative to an air-fuel ratio before the internal combustion engine is shut off, such that it should be detected whether or not the humidity sensor has failed based on the output signal from the humidity sensor if the air-fuel ratio at least immediately before the internal combustion engine is shut off is kept at an air-fuel ratio close to a stoichiometric air-fuel ratio continuously for a predetermined period of time.

Specifically, if the internal combustion engine is operated with the air-fuel ratio thereof being kept as an air-fuel ratio close to the stoichiometric air-fuel ratio, then the exhaust gas emitted from the internal combustion engine contains a relatively large amount of moisture, and the moisture contained in the exhaust gas has a substantially constant concentration. If, therefore, the air-fuel ratio immediately before the internal combustion engine is shut off is continuously kept as an air-fuel ratio close to the stoichiometric air-fuel ratio, then an exhaust gas containing a sufficient amount of moisture at a substantially constant concentration is present near the hydrocarbon adsorbent immediately after the internal combustion engine is shut off. Therefore, the hydrocarbon adsorbent smoothly adsorbs moisture and is saturated thereby, so that the humidity near the hydrocarbon adsorbent reliably enters the steady humidity state, and the stability of the humidity of the hydrocarbon adsorbent in the steady humidity state is increased. As a result, the output signal from the humidity sensor in the predetermined period when the humidity sensor has failed to operate and the output signal from the humidity sensor in the predetermined period when the humidity sensor has not failed to operate are clearly distinguished from each other, thereby increasing the accuracy of the process of detecting whether the humidity sensor has failed or not.

Preferably, the predetermined operating conditions include a condition relative to a warmed-up state before the internal combustion engine is shut off, such that the step of detecting whether or not the humidity sensor has failed is carried out if an engine temperature at least immediately before the internal combustion engine is shut off is equal to or greater than a predetermined temperature. According to such a process, when the engine temperature is equal to or greater than the predetermined temperature, the internal combustion engine has been warmed up sufficiently, i.e., the air-fuel mixture is combusted stably in the internal combustion engine, and the hydrocarbon adsorbent has been heated sufficiently to release the moisture that has been adsorbed by the hydrocarbon adsorbent. When the internal combustion engine is shut off in such a state, any variations in the humidity of the exhaust gas in the hydrocarbon adsorbent immediately after the internal combustion engine is shut off are reduced, and the hydrocarbon adsorbent smoothly adsorbs a maximum amount of moisture depending on the deteriorated state thereof after the temperature of the hydrocarbon adsorbent is lowered to a certain extent. As a consequence, the stability of the output signal of the humidity sensor in the predetermined period is increased, resulting in an increase in the accuracy with which to detect whether or not the humidity sensor has failed.

According to the present invention, the step of detecting whether or not the humidity sensor has failed should preferably be carried out by comparing the output signal of the humidity sensor acquired within the predetermined period with a threshold established depending on the temperature of the hydrocarbon adsorbent when data of the output signal of the humidity sensor is acquired. As described above, the maximum amount of moisture that can be adsorbed by the hydrocarbon adsorbent is affected by the temperature of the hydrocarbon adsorbent. Basically, the maximum amount of moisture that can be adsorbed by the hydrocarbon adsorbent is greater as the temperature of the hydrocarbon adsorbent is lower. Therefore, the output signal of the humidity sensor in the predetermined period is affected by the temperature of the hydrocarbon adsorbent. The threshold to be compared with the output signal from the humidity sensor within the predetermined period for detecting whether or not the humidity sensor has failed is set depending on the temperature of the hydrocarbon adsorbent at the time data of the output signal from the humidity sensor is acquired. Therefore, the reliability of the process of detecting whether or not the humidity sensor has failed can be increased.

It is preferable to provide two thresholds, i.e., an upper limit threshold and a lower limit threshold, as the above threshold. If the output signal from the humidity sensor in the predetermined period falls in a range between the upper limit threshold and the lower limit threshold, then it is judged that the humidity sensor does not suffer a failure. If the output signal from the humidity sensor falls out of the above range, then it is judged that the humidity sensor has failed to operate.

The above and other objects, features, and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
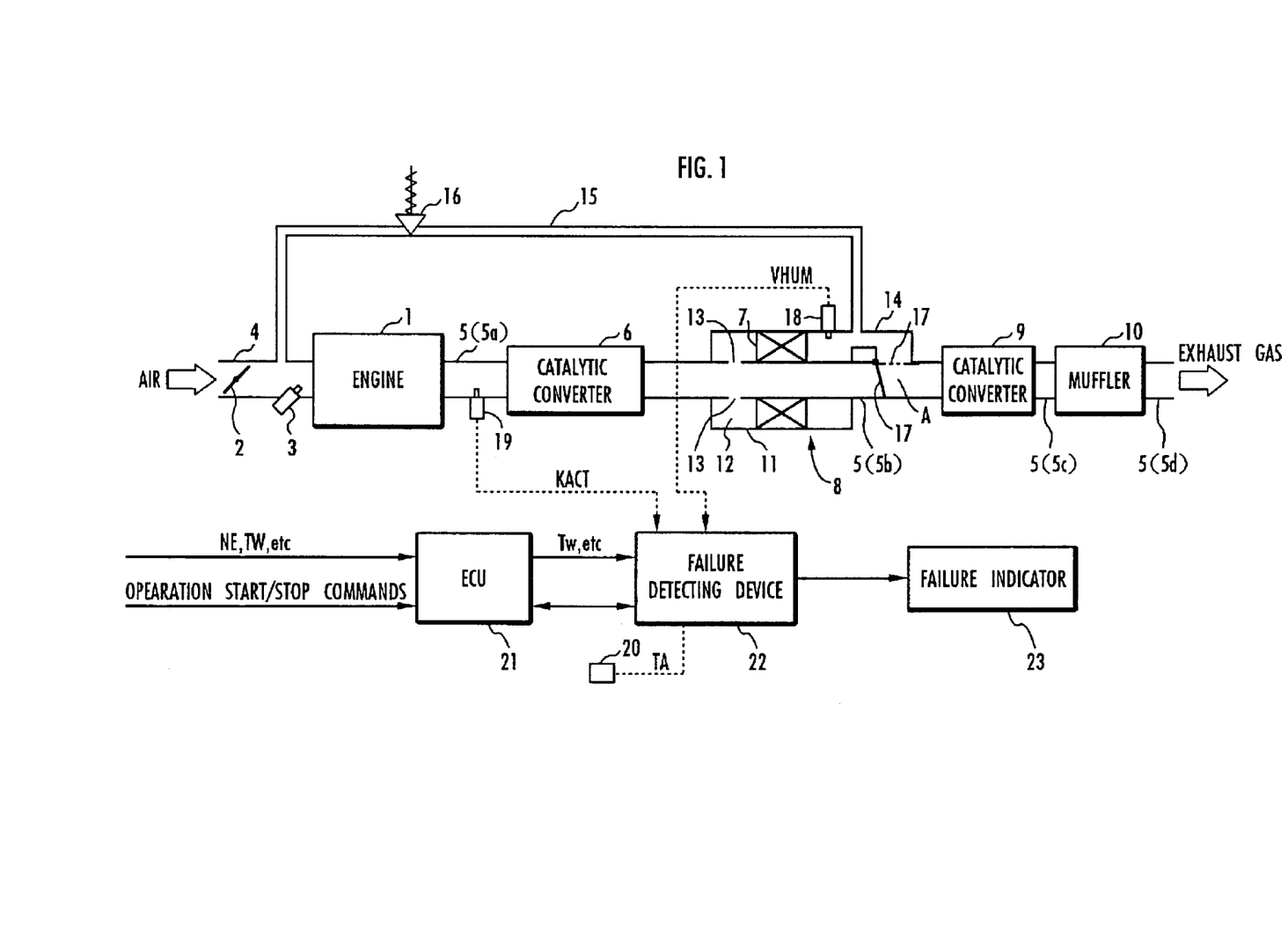
FIG. 1 is a block diagram of a system arrangement of an apparatus for carrying out a method of detecting a failure of a humidity sensor according to a first embodiment of the present invention.

A method of detecting a failure of a humidity sensor according to a first embodiment of the present invention will be described below with reference to FIGS. 1 through 5. FIG. 1 shows in block form a system arrangement of an apparatus for carrying out the method according to the first embodiment of the present invention.

As shown in FIG. 1, an internal combustion engine 1 is mounted on an automobile or a hybrid vehicle, for example. As with ordinary internal combustion engines, the internal combustion engine 1 draws a mixture of fuel and air through an intake pipe 4 having a throttle valve 2 and a fuel injector 3, combusts the mixture, and discharges an exhaust gas which is produced upon combustion of the mixture into an exhaust pipe (exhaust passage) 5. On the exhaust pipe 5, there are mounted a catalytic converter 6, an exhaust gas purifier 8 having a hydrocarbon adsorbent 7 (hereinafter referred to as "HC adsorbent 7"), and a catalytic converter 9, successively downstream in the order named, for purifying the exhaust gas emitted from the internal combustion engine 1. A muffler (silencer) 10 is also mounted on the exhaust pipe 5 downstream of the catalytic converter 9. A portion of the exhaust pipe 5 which extends upstream of the catalytic converter 5 is referred to as a first exhaust pipe 5a. A portion of the exhaust pipe 5 which extends between the catalytic converters 6, 9, i.e., a portion of the exhaust pipe 5 on which the exhaust gas purifier 8 is mounted is referred to as a second exhaust pipe 5b. A portion of the exhaust pipe 5 which extends between the catalytic converter 9 and the muffler 10 is referred to as a third exhaust pipe 5c. A portion of the exhaust pipe 5 which extends downstream of the muffler 10 is referred to as a fourth exhaust pipe 5d. The fourth exhaust pipe 5d has a downstream end open into the atmosphere.

Each of the catalytic converters 6, 9 has a three-way catalyst (not shown). The catalytic converters 6, 9 purify, by way of oxidizing and reducing reactions, gas components including nitrogen oxide (NOx), hydrocarbons (HC), carbon monoxide (CO), etc. contained in the exhaust gas emitted from the internal combustion engine 1 and supplied from the first and second exhaust pipes 5a, 5b respectively into the catalytic converters 6, 9. One of the catalytic converters 6, 9, e.g., the catalytic converter 9, may be dispensed with.

The exhaust gas purifier 8 has a substantially cylindrical housing 11 mounted on the second exhaust pipe 5b in covering relation to an outer circumferential surface thereof. The second exhaust pipe 5b extends axially centrally through the housing 11. A tubular space 12 defined between the inner circumferential surface of the housing 11 and the outer circumferential surface of the second exhaust pipe 5b serves as a bypass exhaust passage 12 for passing an exhaust gas flowing out of the second exhaust pipe 5b. The HC adsorbent 7 in a tubular form is mounted in the bypass exhaust passage 12. The HC adsorbent 7 is made of a zeolite-based material and serves to adsorb HC contained in the exhaust gas which is emitted from the internal combustion engine 1 in an initial phase of operation of the internal combustion engine 1.

The bypass exhaust passage 12 communicates with the second exhaust pipe 5b through a plurality of communication holes 13 which are defined in the wall of the second exhaust pipe 5b within the housing 11 upstream of the HC adsorbent 7. The bypass exhaust passage 12 also communicates with the second exhaust pipe 5b through a joint pipe 14 extending from the housing 11 downstream of the HC adsorbent 7. The bypass exhaust passage 12 is also connected to the intake pipe 4 downstream of the throttle valve 2 by an EGR (Exhaust Gas Recirculation) passage 15 extending from the housing 11 downstream of the HC adsorbent 7. The EGR passage 15 serves to return the exhaust gas to the intake pipe 4 under given conditions during operation of the internal combustion engine 1 in order to combust an unburned gas in the exhaust gas. An on/off solenoid-operated valve 16 is mounted in the EGR passage 15 for selectively opening and closing the EGR passage 15.

The second exhaust pipe 5b and the joint pipe 14 are joined to each other at a junction A where there is disposed a directional control valve 17 for venting one, at a time, of the portion of the second exhaust pipe 5b upstream of the junction A and the bypass exhaust passage 12 to an atmospheric side, i.e., to the catalytic converter 9 and the muffler 10. The directional control valve 17 can be actuated by an actuator such as a motor or the like. When the directional control valve 17 is actuated into a solid-line position in FIG. 1, it shields the portion of the second exhaust pipe 5b upstream of the junction A from the atmospheric side, and vents the bypass exhaust passage 12 to the atmospheric side. Conversely, when the directional control valve 17 is actuated into an imaginary-line position in FIG. 1, it vents the second exhaust pipe 5b to the atmospheric side, and shields the bypass exhaust passage 12 from the atmospheric side.

The apparatus also has, in addition to the above mechanical structures, the following components: The apparatus has a humidity sensor 18 mounted on the housing 11 near the HC adsorbent 7 for detecting the humidity of the exhaust gas near the HC adsorbent 7, an air-fuel ratio sensor 19 mounted on the first exhaust pipe 5a upstream of the catalytic converter 6 for detecting the air-fuel ratio of the air-fuel mixture which has been combusted by the internal combustion engine 1, and an atmospheric temperature sensor 20 for detecting the temperature of the atmosphere as the temperature outside of the internal combustion engine 1 and its exhaust system (the exhaust pipe 5, etc.).

The humidity sensor 18 is a sensor for generating an output signal depending on the humidity (relative humidity) of the exhaust gas. The air-fuel ratio sensor 19 is a sensor for generating an output signal depending on the oxygen concentration in the exhaust gas, which depends on the air-fuel ratio of the air-fuel mixture which has been combusted by the internal combustion engine 1. The atmospheric temperature sensor 20 is a sensor for generating an output signal depending on the temperature of the atmosphere. In the description which follows, the relative humidity, the air-fuel ratio, and the atmospheric temperature which are detected respectively from the output signals of the humidity sensor 18, the air-fuel ratio sensor 19, and the atmospheric temperature sensor 20 are represented respectively by VHUM, KACT, and TA. In the system shown in FIG. 1, the humidity sensor 18 is disposed downstream of the HC adsorbent 7. However, the humidity sensor 18 may be located anywhere insofar as it can detect the humidity of the exhaust gas in the vicinity of the HC adsorbent 7, and may be disposed upstream of the HC adsorbent 7. If a plurality of beds for the HC adsorbent are provided in the bypass exhaust passage 12, then the humidity sensor may be disposed between adjacent two of those beds.

The apparatus further has a controller 21 (hereinafter referred to as "ECU 21") for controlling operation of the internal combustion engine 1 (including operation of the on/off valve 16 in the EGR passage 15 and the directional control valve 17), a failure detecting device 22 for executing a processing sequence to detect whether or not the humidity sensor 18 has failed to operate, and a failure indicator 23 for indicating a failure detected by the failure detecting device 22. The ECU 21 and the failure detecting device 22 are implemented by a microcomputer. The failure indicator 23 comprises a lamp, a buzzer, or a display unit for displaying characters, a graphic image, etc.

The ECU 21 is supplied with detected data of the rotational speed NE of the internal combustion engine 1, the engine temperature TW thereof (specifically, the temperature of the coolant of the internal combustion engine 1), etc. from non-illustrated sensors, and also with an operation start command signal and an operation stop command signal for the internal combustion engine 1 from a non-illustrated operation switch. The ECU 21 then controls operation of the internal combustion engine 1 based on the detected data and the command signals that are supplied thereto, according to a predetermined control program. Specifically, the ECU 21 controls the opening of the throttle valve 2 with an actuator (not shown), controls the amount of fuel injected by the fuel injector 3 (controls the air-fuel ratio of the air-fuel mixture to be combusted by the internal combustion engine 1), controls an igniter (not shown), controls the starting of the internal combustion engine 1 with a starter motor (not shown), controls the on/off valve 16 mounted in the EGR passage 15, and controls operation of the directional control valve 17.

The failure detecting device 22 is supplied with the output signal from the humidity sensor 18 (a signal indicative of a detected value of the relative humidity VHUM), the output signal from the air-fuel ratio sensor 19 (a signal indicative of a detected value of the air-fuel ratio KACT), and the output signal from the atmospheric temperature sensor 20 (a signal indicative of a detected value of the atmospheric temperature TA). The failure detecting device 22 can exchange various data with the ECU 21. For example, the failure detecting device 22 is supplied with data representative of the engine temperature TW of the internal combustion engine 1. The failure detecting device 22 detects whether or not the humidity sensor 18 has failed based on the supplied data according to a predetermined program, as described later on. When the failure detecting device 22 judges that the humidity sensor 18 has failed to operate, the failure detecting device 22 controls the failure indicator 23 to indicate the failure as detected.

The humidity sensor 18 serves to evaluate a deteriorated state of the HC adsorbent 7, and the failure detecting device 22 also has a function to evaluate a deteriorated state of the HC adsorbent 7 based on the output of the humidity sensor 18. These functions of the humidity sensor 18 and the failure detecting device 22 will not be described in detail below as they have no direct bearing on the present invention.

Operation of the apparatus according to the present embodiment will be described in detail below. A basic mode of operation when the internal combustion engine 1 is in operation will first be described below. When the operation switch (not shown) is turned on to start operation of the internal combustion engine 1, the ECU 21 and the failure detecting device 22 are activated. The ECU 21 operates the directional control valve 17 to move to the solid-line position in FIG. 1 with the non-illustrated motor, and thereafter starts the internal combustion engine 1 with the starter motor (not shown), the fuel injector 3, and the igniter (not shown).

When the internal combustion engine 1 starts to operate, the exhaust gas emitted from the internal combustion engine 1 flows successively through the first exhaust pipe 5a, the catalytic converter 6, the upstream portion of the second exhaust pipe 5b which extends from the catalytic converter 6 to the communication holes 13, the bypass exhaust passage 12 (including the HC adsorbent 7), the joint pipe 14, the downstream portion of the second exhaust pipe 5b which extends downstream from the directional control valve 17, the catalytic converter 9, the third exhaust pipe 5c, the muffler 10, and the fourth exhaust pipe 5d, and is discharged into the atmosphere. While the exhaust gas passes through the HC adsorbent 7 in the bypass exhaust passage 12, hydrocarbons contained in the exhaust gas are adsorbed by the HC adsorbent 7. The HC adsorbent 7 adsorbs hydrocarbons contained in the exhaust gas and also adsorbs moisture in the exhaust gas.

When the catalytic converters 6, 9 are heated and activated by the exhaust gas, the ECU 21 moves the directional control valve 7 to the imaginary-line position in FIG. 1, thus shielding the bypass exhaust passage 12 against the atmosphere and venting the second exhaust pipe 5b (upstream of the junction A) to the atmospheric side. The exhaust gas emitted from the internal combustion engine 1 is now discharged successively through the first exhaust pipe 5a, the catalytic converter 6, the second exhaust pipe 5b, the catalytic converter 9, the third exhaust pipe 5c, the muffler 10, and the fourth exhaust pipe 5d into the atmosphere. At this time, gas components including HC, CO, NOx, etc. of the exhaust gas are purified by the catalytic action (oxidizing and reducing reactions) of the catalytic converters 6, 9.

While the bypass exhaust passage 12 is being shielded against the atmosphere by the directional control valve 17, the ECU 21 opens the on/off valve 16 in the EGR passage 15 under certain conditions of the rotational speed NE and the engine temperature TW of the internal combustion engine 1. At this time, part of the exhaust gas flowing through the exhaust pipe 5 flows through the communication holes 13 in the second exhaust pipe 5b into the bypass exhaust passage 12, and flows from the bypass exhaust passage 12 through the EGR passage 15 back into the intake pipe 4 of the internal combustion engine 1. If the HC adsorbent 7 has been heated to a temperature, e.g., ranging from 100 to 250° C., high enough to release the HC adsorbed by the HC adsorbent 7 immediately after the internal combustion engine 1 has started, then the HC are released from the HC adsorbent 7, flow back into the intake pipe 4, and are combusted by the internal combustion engine 1.

While the internal combustion engine 1 is in operation, the ECU 21 basically controls the rate at which the fuel injector 3 supplies the fuel to the internal combustion engine 1 to keep the air-fuel ratio of the air-fuel mixture to be combusted by the internal combustion engine 1 close to the stoichiometric air-fuel ratio, except when the fuel supplied to the internal combustion engine 1 is cut off or the internal combustion engine 1 is operated on a lean air-fuel mixture under certain conditions.

When the operation switch (not shown) is turned off, the ECU 21 stops supplying the fuel from the fuel injector 3 to the internal combustion engine 1, thus shutting off the internal combustion engine 1.

Figure 2:
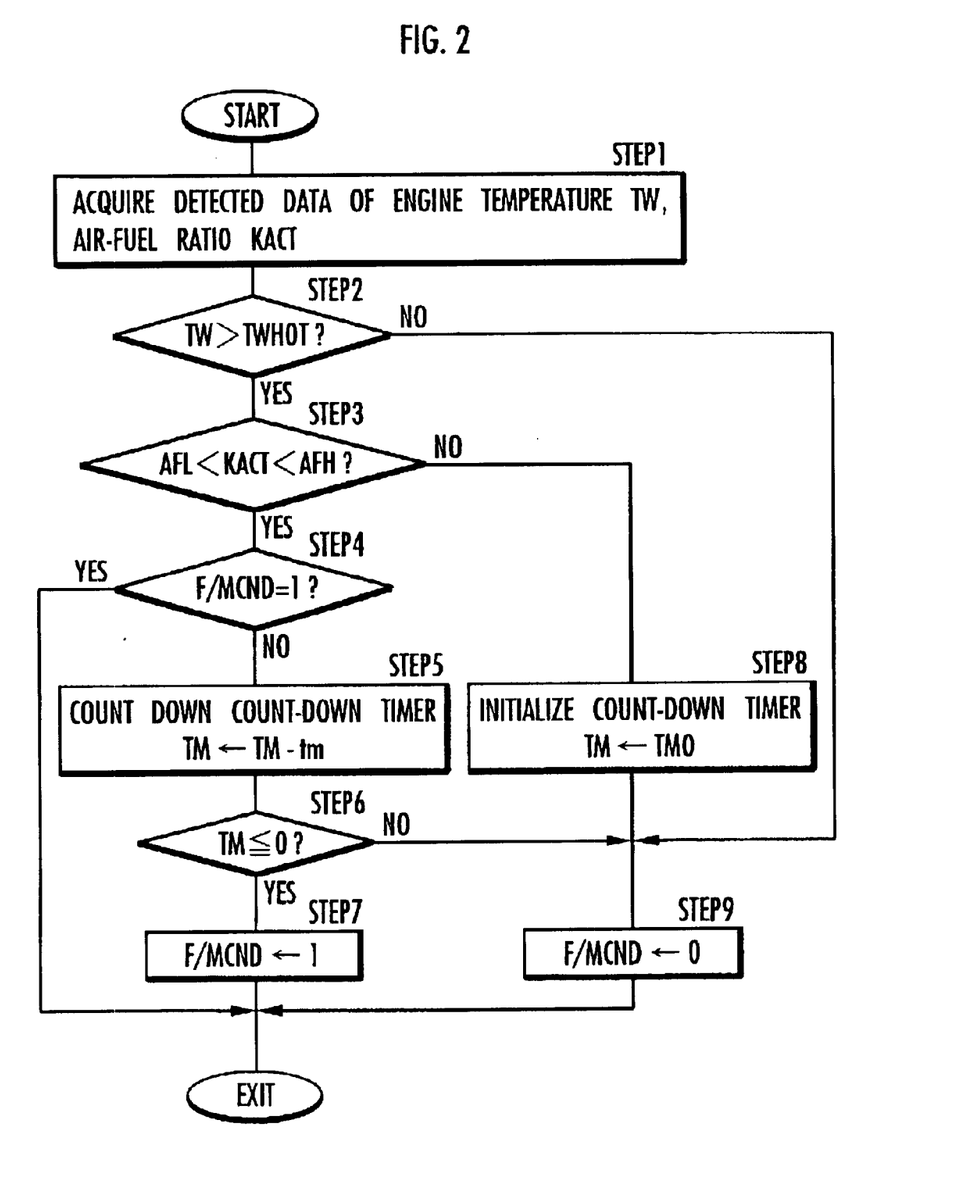
FIG. 2 is a flowchart of an operation sequence of the apparatus shown in FIG. 1.

While the internal combustion engine 1 is in operation, the failure detecting device 22 performs an operation sequence shown in FIG. 2 in a given control cycle. In the operation sequence shown in FIG. 2, the failure detecting device 22 acquires present detected value data of the engine temperature TW of the internal combustion engine 1 from the ECU 21 and detected value data of the air-fuel ratio KACT of the air-fuel mixture which has been combusted by the internal combustion engine 1 (hereinafter referred to as "air-fuel ratio KACT of the internal combustion engine 1") based on the present output signal of the air-fuel sensor 19 in STEP1.

Then, the failure detecting device 22 determines whether or not the detected value (present value) of the engine temperature TW of the internal combustion engine 1 is higher than a predetermined value TWHOT in STEP 2 for thereby determining whether the internal combustion engine 1 has been warmed up sufficiently or not. The predetermined value TWHOT is set to 85° C., for example. When the engine temperature TW is higher than the predetermined value TWHOT (TW>TWHOT), the catalytic converters 6, 9 have basically been warmed and activated sufficiently, and the HC adsorbent 7 of the exhaust gas purifier 8 has been warmed to a temperature capable of releasing the adsorbed HC.

If TW≦TWHOT in STEP 2, then because given conditions for appropriately detecting whether or not the humidity sensor 18 has failed to operate, i.e., conditions regarding the engine temperature TW and the air-fuel ratio KACT during operation of the internal combustion engine 1, have not been satisfied, the failure detecting device 22 sets a flag F/MCND to "0" in STEP9, and then the present control cycle is put to an end. The flag F/MCND is a flag used when the failure detecting device 22 executes a process of detecting whether or not the humidity sensor 18 has failed to operate while the internal combustion engine 1 is being shut off, as described later on. The flag F/MCND has an initial value of "0" at the time the internal combustion engine 1 starts to operate.

If TW>TWHOT in STEP 2, then the failure detecting device 22 determines whether or not the detected value (present value) of the air-fuel ratio KACT of the internal combustion engine 1 falls in a predetermined range, i.e., a range of AFL<KACT<AFH, or not in STEP 3. The lower-limit value AFL of the range represents an air-fuel ratio slightly leaner than the stoichiometric air-fuel ratio, and the upper-limit value AFH of the range represents an air-fuel ratio slightly richer than the stoichiometric air-fuel ratio.

If the detected value of the air-fuel ratio KACT of the internal combustion engine 1 falls outside of the predetermined range, i.e., if KACT≦AFL or KACT≧AFH, in STEP 3, then the failure detecting device 22 initializes the count value TM of a count-down timer for measuring a period of time in which the air-fuel ratio KACT is continuously kept in the above predetermined range, to a given initial value TM0 in STEP 8. Then, the failure detecting device 22 sets the flag F/MCND to "0" in STEP9, after which the present control cycle is ended.

If AFL<KACT<AFH in STEP 3, then the failure detecting device 22 judges the value (present value) of the flag F/MCND in STEP4. If F/MCND=1, then the failure detecting device 22 puts the present control cycle to an end. If F/MCND=0, then the failure detecting device 22 counts down the count value TM of the count-down timer by a given value Δtm in STEP5. The failure detecting device 22 determines in STEP6 whether or not the count value TM is "0" or smaller, i.e., whether the state where AFL<KACT<AFH or the state where the air-fuel ratio KACT of the internal combustion engine 1 is close to the stoichiometric air-fuel ratio has continued for at least a given period of time corresponding to the initial value TM0 of the count value TM or not.

If TM>0, then the failure detecting device 22 sets the flag F/MCND to "0" in STEP9, after which the present control cycle is ended. If TM≦0, then because the conditions for appropriately evaluating a deteriorated state of the HC adsorbent 7, i.e., the conditions regarding the engine temperature TW and the air-fuel ratio KACT during operation of the internal combustion engine 1, have been satisfied, the failure detecting device 22 sets the flag F/MCND to "1" in STEP7. Thereafter, the present control cycle is ended.

According to the operation sequence shown in FIG. 2, if the engine temperature TW of the internal combustion engine 1 is higher than the predetermined value TWHOT and the air-fuel ratio KACT of the internal combustion engine 1 has continuously been kept close to the stoichiometric air-fuel ratio for at least the period of time corresponding to the initial value TM0 of the count value TM, then the flag F/MCND is set to "1". If the engine temperature TW of the internal combustion engine 1 is lower than the predetermined value TWHOT or the air-fuel ratio KACT falls out of a given range close to the stoichiometric air-fuel ratio due to a temporary disturbance or a fuel-cutoff operation of the internal combustion engine 1, or if the air-fuel ratio KACT has not continuously been kept close to the stoichiometric air-fuel ratio for at least the period of time corresponding to the initial value TM0 of the count value TM, then the flag F/MCND is set to "0".

The operation sequence shown in FIG. 2 is carried out only while the internal combustion engine 1 is in operation. The value of the flag F/MCND is determined while internal combustion engine 1 is being shut off. To prevent the value of the flag F/MCND from being lost while internal combustion engine 1 is being shut off, the failure detecting device 22 stores the value of the flag F/MCND in a non-volatile memory such as an EEPROM or the like (not shown) or a memory that is energized at all times by a battery or the like (not shown). Therefore, while the internal combustion engine 1 is being shut off, the flag F/MCND is set to "1" only if the engine temperature TW of the internal combustion engine 1 is higher than the predetermined value TWHOT and the air-fuel ratio KACT of the internal combustion engine 1 has continuously been kept close to the stoichiometric air-fuel ratio for at least the period of time corresponding to the initial value TM0 of the count value TM immediately before the internal combustion engine 1 is shut off.

Figure 3:
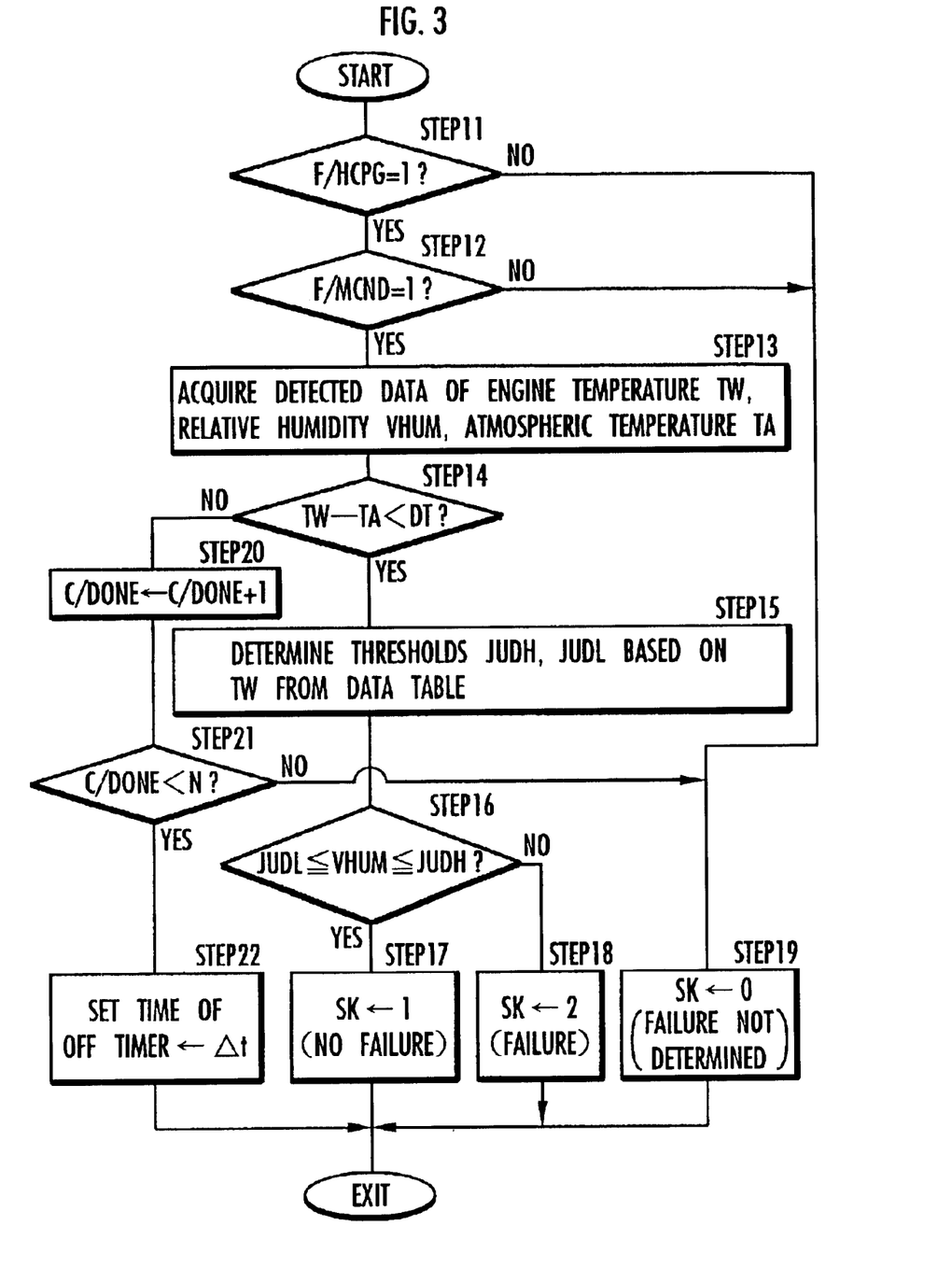
FIG. 3 is a flowchart of an operation sequence of the apparatus shown in FIG. 1.

The failure detecting device 22, which executes the operation sequence shown in FIG. 2 during operation of the internal combustion engine 1, carries out an operation sequence shown in FIG. 3 at a given time during shutdown of the internal combustion engine 1, for thereby detecting whether the humidity sensor 18 has failed to operate or not. Prior to describing the operation sequence shown in FIG. 3 (hereinafter referred to as "failure detecting process"), a basic tendency of time-dependent changes of the relative humidity VHUM (relative humidity near the HC adsorbent 7) detected based on the output signal from the humidity sensor 18 and time-dependent changes of the engine temperature TW of the internal combustion engine 1 during shutdown of the internal combustion engine 1 will first be described below.

Figure 4:
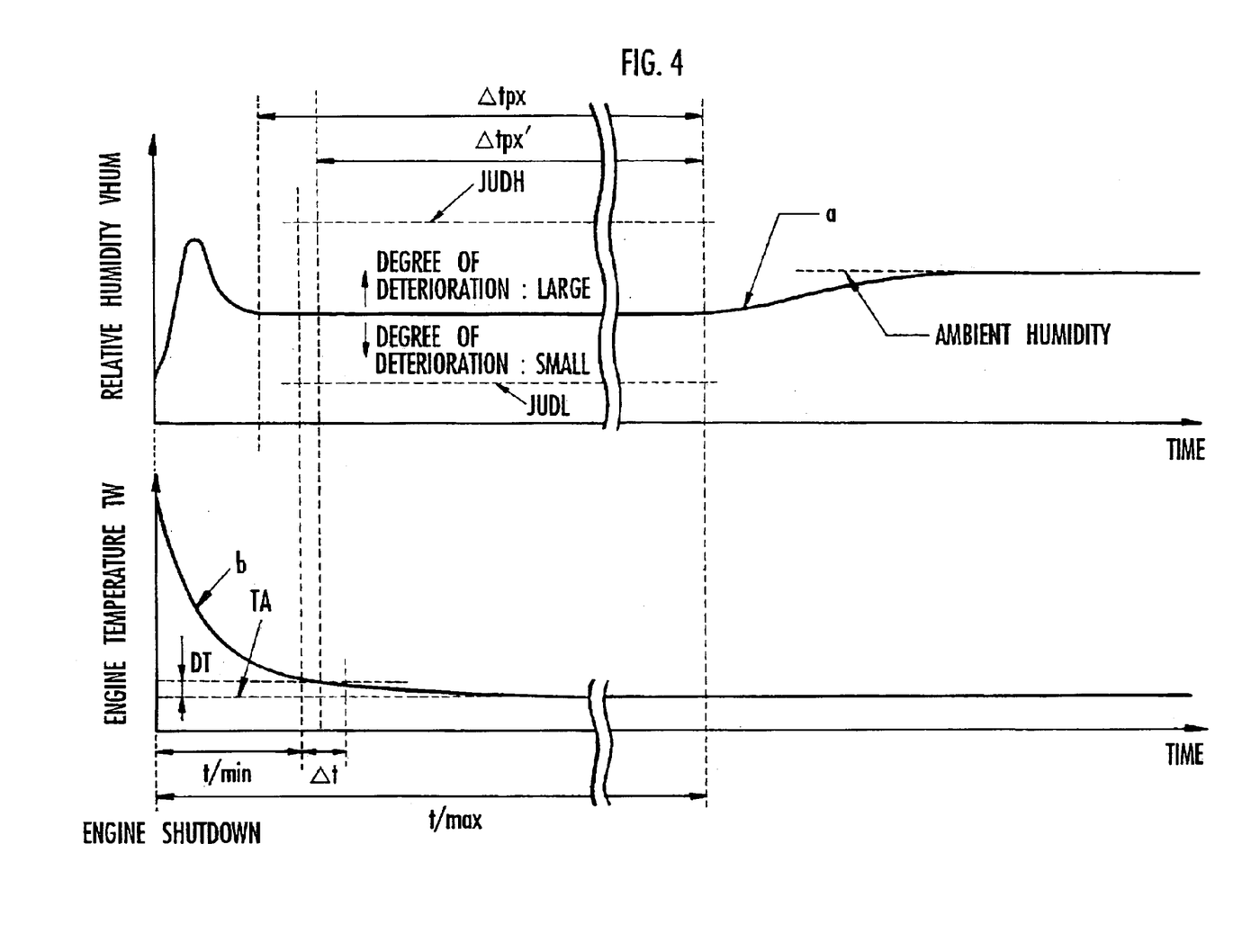
FIG. 4 is a graph showing the manner in which the apparatus shown in FIG. 1 operates.

FIG. 4 shows, in an upper section thereof, a curve a representing time-depending changes of the detected value of the relative humidity VHUM from the humidity sensor 18 after the internal combustion engine 1 is shut off on the assumption that the humidity sensor 18 is normal. FIG. 4 also shows, in a lower section thereof, a curve b representing time-depending changes of the detected value of the engine temperature TW after the internal combustion engine 1 is shut off.

As can be seen from the curve a in FIG. 4, the relative humidity VHUM near the HC adsorbent 7 as detected by the humidity sensor 18 temporarily increases immediately after the internal combustion engine 1 is shut off because the saturated water vapor pressure is lowered due to a reduction in the temperature of the exhaust gas purifier 8, etc. When the temperature of the HC adsorbent 7 of the exhaust gas purifier 8 drops to a value for adsorbing moisture as well as HC in the exhaust gas, since the HC adsorbent 7 starts to adsorbs moisture in the exhaust gas present around the HC adsorbent 7, the relative humidity VHUM near the HC adsorbent 7 decreases. When the HC adsorbent 7 continuously adsorbs moisture until it is saturated, the relative humidity VHUM near the HC adsorbent 7 has minimum time-dependent changes and becomes substantially constant for a relatively long period Δtpx in FIG. 4.

As the deterioration of the HC adsorbent 7 (the reduction of its ability to adsorb HC and moisture) is larger, the maximum amount of moisture which can be adsorbed by the HC adsorbent 7 is smaller. The level of the relative humidity VHUM as it is substantially constant near the HC adsorbent 7 is higher as the HC adsorbent 7 is deteriorated to a larger extent and lower as the HC adsorbent 7 is deteriorated to a smaller extent. The curve a in FIG. 4 represents time-dependent changes in the relative humidity when the deterioration of the HC adsorbent 7 progresses to a certain extent from its brand-new state. When the HC adsorbent 7 is brand-new, for example, the level of the relative humidity VHUM as it becomes substantially constant is lower than the level represented by the curve a in FIG. 4.

When the relative humidity VHUM near the HC adsorbent 7 is substantially constant, there is a certain limitation on changes in the level of the relative humidity VHUM as detected by the humidity sensor 18 due to changes in the deteriorated state of the HC adsorbent 7, in that the level of the relative humidity VHUM does not exceed an upper limit level JUDH and does not become lower than a lower limit level JUDL in FIG. 4. Therefore, the relative humidity VHUM as it is substantially constant near the HC adsorbent 7 changes between the upper limit level JUDH and the lower limit level JUDL depending on the deteriorated state of the HC adsorbent 7. The upper limit level JUDH and the lower limit level JUDL vary depending on the temperature of the HC adsorbent 7, as described later on.

When the period of time that has elapsed after the internal combustion engine 1 is shut off, i.e., the period of time that has elapsed during shutdown of the internal combustion engine 1, becomes sufficient long (e.g., for several tens of hours), because a gas exchange between the interior of the exhaust pipe 5 and the bypass exhaust passage 12 and the atmosphere gradually progresses, the relative humidity VHUM near the HC adsorbent 7 finally converges to the ambient humidity, which is the atmospheric humidity outside of the exhaust pipe 5 and the bypass exhaust passage 12, as indicated by a right portion of the curve a.

The time when the period Δtpx (hereinafter referred to as "steady humidity period Δtpx") in which the relative humidity VHUM near the HC adsorbent 7 is actually substantially constant starts depends on the temperature of the exhaust system (the exhaust gas purifier 8, etc.), the atmospheric temperature TA, the volume of the HC adsorbent, etc. at the time the internal combustion engine 1 is shut off. With the system according to the present embodiment, the steady humidity period Δtpx starts when about two through four hours have elapsed after the internal combustion engine 1 is shut off. The steady humidity period Δtpx ends depending on the structure of the exhaust system from the exhaust gas purifier 8 to the downstream end of the exhaust pipe 5. with the system according to the present embodiment, the steady humidity period Δtpx ends when about 24 through 72 hours, representing a period t/max in FIG. 4, have elapsed after the internal combustion engine 1 is shut off.

As can be seen from the curve d in FIG. 4, the engine temperature TW of the internal combustion engine 1 gradually drops after the internal combustion engine 1 is shut off, and is finally converged to the atmospheric temperature TA detected by the atmospheric temperature sensor 20. The temperature of the exhaust system of the internal combustion engine 1, e.g., the temperature of the exhaust gas purifier 8, also basically drops according to the tendency of the engine temperature TW, and is finally converged to the atmospheric temperature TA. When the engine temperature TW and the temperature of the exhaust system of the internal combustion engine 1, e.g., the exhaust gas purifier 8, etc., drop to a temperature equivalent to the atmospheric temperature TA, because the saturated water vapor pressure present in the exhaust system becomes substantially constant, the relative humidity VHUM near the HC adsorbent 7 basically becomes substantially constant.

As described above, the relative humidity VHUM near the HC adsorbent 7 during the steady humidity period Δtpx is substantially constant and the level of the substantially constant relative humidity VHUM depends on the deteriorated state of the HC adsorbent 7 in a certain range. According to the present embodiment, therefore, the relative humidity VHUM detected by the humidity sensor 18 in the steady humidity period Δtpx is compared with the upper limit level JUDH and the lower limit level JUDL which are set as described below, to detect whether or not the humidity sensor 18 has failed to operate. To make such a detection appropriately, it is necessary to reliably use the detected value of the relative humidity VHUM in the steady humidity period Δtpx. In the present embodiment, after a given period of time t/min has elapsed from the shutdown of the internal combustion engine 1, the detected value of the relative humidity VHUM at the time the engine temperature TW is substantially converged to the atmospheric temperature TA is used to detect whether or not the humidity sensor 18 has failed to operate. Stated otherwise, it is assumed that the period of time in which the relative humidity VHUM near the HC adsorbent 7 is substantially constant begins from the time when the predetermined period of time t/min has elapsed and the engine temperature TW is substantially converged to the atmospheric temperature TA, and it is detected whether or not the humidity sensor 18 has failed to operate using the detected value of the relative humidity VHUM at the beginning of that period of time. The predetermined period of time t/min is basically determined such that the time when the period of time that has elapsed after the internal combustion engine 1 is shut off becomes equal to the predetermined period of time t/min is present in the steady humidity period Δtpx, and is set to two hours, for example, according to the present embodiment.

On the basis of the foregoing description, the failure detecting process according to the operation sequence shown in FIG. 3 which is carried out by the failure detecting device 22 during shutdown of the internal combustion engine 1 will be described below with reference to FIG. 3.

The system according to the present invention has a timer (not shown, hereafter referred to as "off timer") for measuring a period of time that elapses from the shutdown of the internal combustion engine 1 and activating the ECU 21 and the failure detecting device 22 with electric energy supplied from the non-illustrated battery when the measured period of time has reached a preset period of time. The failure detecting device 22 executes the failure detecting process shown in FIG. 3 only when the ECU 21 and the failure detecting device 22 are activated by the off timer while the internal combustion engine 1 is being shut off. The off timer is set to the predetermined period of time t/min (see FIG. 4) when the internal combustion engine 1 is shut off. Therefore, the failure detecting process shown in FIG. 3 is executed only when the predetermined period of time t/min (two hours in the present embodiment) has elapsed after the shutdown of the internal combustion engine 1 while the internal combustion engine 1 is being shut off.

Specifically, the failure detecting process is carried out as follows: The failure detecting device 22 determines whether or not the release of the HC adsorbed by the HC adsorbent 7 during the preceding operation of the internal combustion engine 1 is completed or not based on the value of a flag F/HCPG in STEP11. The flag F/HCPG is "1" if the release of the HC adsorbed by the HC adsorbent 7 is completed and "0" if the release of the HC adsorbed by the HC adsorbent 7 is not completed. The flag F/HCPG is set by the ECU 21 while the internal combustion engine 1 is in operation. The ECU 21 determines an integrated value of the amount of the gas flowing through the EGR passage 15 by opening the on/off valve 16 in the EGR passage 15 while the temperature of the HC adsorbent 7 is equal to or higher than a temperature for releasing the HC adsorbed by the HC adsorbent 7.

When the integrated value becomes equal to or higher than a predetermined value, the ECU 21 judges that the release of the HC from the HC adsorbent 7 is completed (at this time, the release of the moisture from the HC adsorbent 7 is also completed), and sets the flag F/HCPG to "1". When the integrated value does not reach the predetermined value, the ECU 21 sets the flag F/HCPG to "0". To prevent the value of the flag F/HCPG from being lost while internal combustion engine 1 is being shut off, the failure detecting device 22 stores the value of the flag F/HCPG in the nonvolatile memory such as an EEPROM or the like (not shown) when the internal combustion engine 1 is shut off.

If F/HCPG=0 in STEP11, since the release of the HC and the moisture adsorbed by the HC adsorbent 7 during the preceding operation of the internal combustion engine 1 is not completed (the HC adsorbent 7 has already adsorbed the moisture when the internal combustion engine 1 is shut off), the failure detecting device 22 sets a detected result parameter SK representing a detected result as to whether the humidity sensor 18 has failed or not to "0" in STEP19. Thereafter, the failure detecting process shown in FIG. 3 is ended. When the detected result parameter SK is "0", it indicates that whether or not the humidity sensor 18 has failed is not determined, and the detected result is not determined. When the detected result parameter SK is "1", it indicates that the humidity sensor 18 has failed to operate, i.e., the humidity sensor 18 is malfunctioning. When the detected result parameter SK is "2", it indicates that the humidity sensor 18 has not failed to operate, i.e., the humidity sensor 18 is normal.

If F/HCPG=1 in STEP11, i.e., if the release of the HC and the moisture adsorbed by the HC adsorbent 7 during the preceding operation of the internal combustion engine 1 is completed, the failure detecting device 22 determines the value of the flag F/MCND set in the preceding operation of the internal combustion engine 1 in STEP12. If F/MCND=0, i.e., if the engine temperature TW is lower than the predetermined value TWHOT immediately before the internal combustion engine 1 is shut off or if the state in which the air-fuel ratio KACT immediately before the internal combustion engine 1 is shut off is kept close to the stoichiometric air-fuel ratio has not continued for the predetermined period of time, then the failure detecting device 22 regards these conditions as inappropriate for determining whether the humidity sensor 18 has failed or not, and sets the detected result parameter SK to "0" in STEP19. Thereafter, the failure detecting process shown in FIG. 3 is ended.

If F/MCND=1 in STEP12, i.e., if the engine temperature TW is higher than the predetermined value TWHOT immediately before the internal combustion engine 1 is shut off and if the state in which the air-fuel ratio KACT immediately before the internal combustion engine 1 is shut off is kept close to the stoichiometric air-fuel ratio has continued for at least the predetermined period of time, then the failure detecting device 22 acquires present detected value data of the engine temperature TW of the internal combustion engine 1 from the ECU 21, acquires present detected value data of the relative humidity VHUM near the HC adsorbent 7 based on the present output signal from the humidity sensor 18, and also acquires present detected value data of the atmospheric temperature TA (the temperature outside of the exhaust system including the exhaust gas purifier 8, etc.) based on the present output signal from the atmospheric temperature sensor 20 in STEP13.

Then, the failure detecting device 22 determines whether the difference (TW−TA) between the present engine temperature TW and the atmospheric temperature TA is smaller than a predetermined value DT or not in STEP14. The predetermined value DT is a sufficiently small positive value. If TW−TA<DT, then it means that the engine temperature TW has dropped to a temperature (substantially constant) substantially equal to the atmospheric temperature TA and the temperature near the HC adsorbent 7 has dropped to a temperature (substantially constant) substantially equal to the atmospheric temperature TA. In STEP14, the failure detecting device 22 uses the engine temperature TW in order to recognize the temperature near the HC adsorbent 7. However, if the temperature near the HC adsorbent 7 is directly detected by a temperature sensor, then the failure detecting device 22 may use the thus detected temperature near the HC adsorbent 7 instead of the engine temperature TW.

Figure 5:
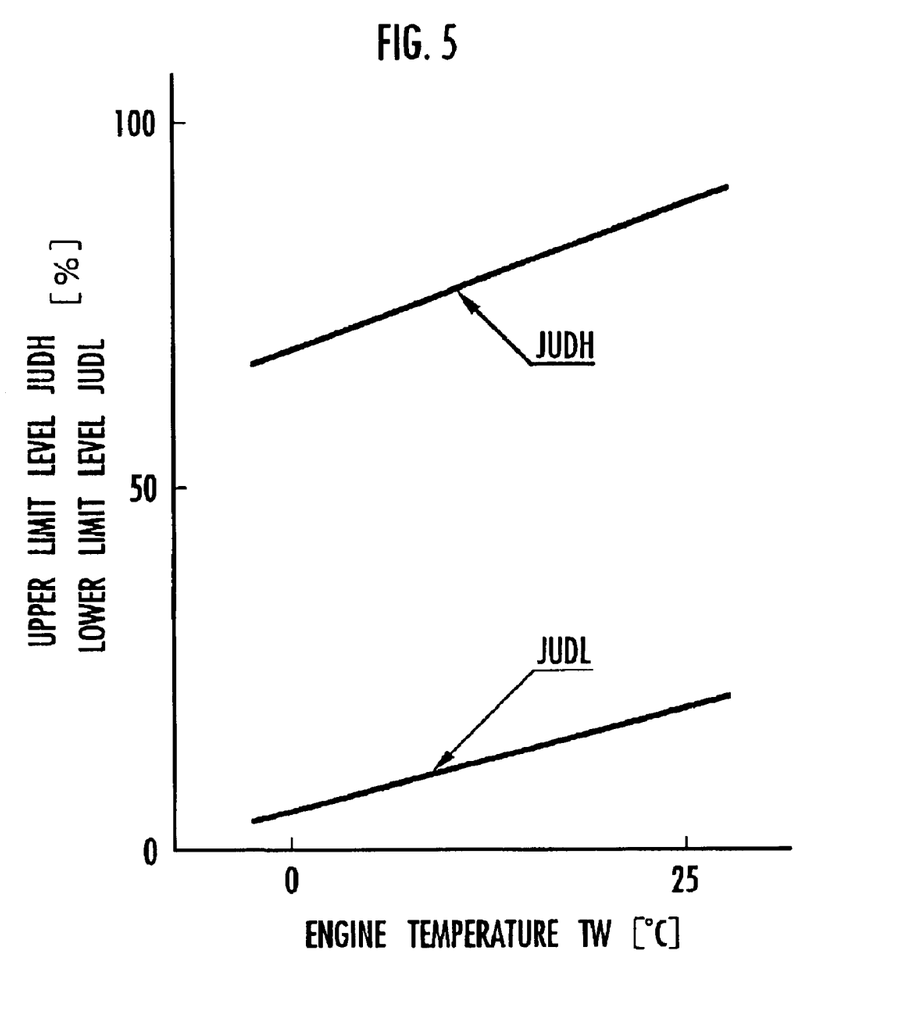
FIG. 5 is a diagram showing the manner in which the apparatus shown in FIG. 1 operates.

If TW−TA<DT in STEP14, i.e., if the engine temperature TW (and the temperature near the HC adsorbent 7) is substantially converged to the atmospheric temperature and is substantially constant, the relative humidity VHUM near the HC adsorbent 7 as detected by the humidity sensor 18 is substantially constant for certain. The failure detecting device 22 now determines the upper limit level JUDH and the lower limit level JUDL, which are thresholds for detecting whether or not the humidity sensor 18 has failed, from the present detected value of the engine temperature TW (acquired in STEP13) based on a predetermined data table shown in FIG. 5 in STEP15. The upper limit level JUDH and the lower limit level JUDL are thresholds (upper limit and lower limit thresholds) to be compared with the present detected value of the relative humidity VHUM (the detected value within the steady humidity period Δtpx shown in FIG. 4) which has been acquired in STEP13. As described above with reference to FIG. 4, if the humidity sensor 18 is normal, then the relative humidity VHUM falls in the range between the upper limit level JUDH and the lower limit level JUDL. As shown in FIG. 5, the upper limit level JUDH and the lower limit level JUDL are set depending on the engine temperature TW such that they are smaller as the engine temperature TW (which represents of the HC adsorbent 7 is lower. The upper limit level JUDH and the lower limit level JUDL are set depending on the engine temperature TW (the temperature of the HC adsorbent 7) because the HC adsorbent 7 adsorbs more moisture as its temperature is lower. Stated otherwise, the relative humidity VHUM near the HC adsorbent 7 in the steady humidity period Δtpx is lower as the temperature of the HC adsorbent 7 is lower.

Then, the failure detecting device 22 compares the present detected value of the relative humidity VHUM acquired in STEP13 with the upper limit level JUDH and the lower limit level JUDL in STEP16. If JUDL≦VHUM≦JUDH (as represented by the curve a in FIG. 4), then the failure detecting device 22 judges that the humidity sensor 18 is in a normal state, i.e., has not failed to operate, and sets the detected result parameter SK to "1" in STEP17. Thereafter, the failure detecting process shown in FIG. 3 is put to an end. If VHUM<JUDL or VHUM>JUDH, then since the detected value of the relative humidity VHUM is abnormal, the failure detecting device 22 judges that the humidity sensor 18 has failed to operate, and sets the detected result parameter SK to "2" in STEP18. Thereafter, the failure detecting process shown in FIG. 3 is put to an end.

When the detected result parameter SK is set in STEP17, STEP18, STEP19, and the failure detecting process shown in FIG. 3 is ended, the failure detecting device 22 and the ECU 21 are turned off until the operation of the internal combustion engine 1 is resumed. The value of the detected result parameter SK is stored in the nonvolatile memory such as an EEPROM or the like during the shutdown of the internal combustion engine 1.

According to the failure detecting process shown in FIG. 3 described above, when the predetermined period of time t/min has elapsed after the internal combustion engine 1 is shut off, if the engine temperature TW (and the temperature near the HC adsorbent 7) drops to a temperature substantially equal to the atmospheric temperature TA (except if F/HCPG=0 or F/MCND=0), it is detected whether or not the humidity sensor 18 has failed.

In the above description, it is assumed that the engine temperature TW drops to a temperature substantially equal to the atmospheric temperature TA when the predetermined period of time t/min has elapsed after the internal combustion engine 1 is shut off. However, because the manner in which the engine temperature TW drops after the internal combustion engine 1 is shut off is affected by the engine temperature TW and the atmospheric temperature TA at the time the internal combustion engine 1 is shut off, the engine temperature TW may not necessarily be lowered to a temperature substantially equal to the atmospheric temperature TA when the predetermined period of time t/min has elapsed, i.e., when the failure detecting process shown in FIG. 3 is executed for the first time after the internal combustion engine 1 is shut off, but it is possible that TW−TA≧DT in STEP14 shown in FIG. 3, e.g., as indicated by the curve d shown in FIG. 4. In such a case, the failure detecting device 22 increments the value of a count parameter C/DONE representing the number of times that the failure detecting process shown in FIG. 3 is executed, by "1" in STEP20, and then compares the value of the count parameter C/DONE with a predetermined upper limit value N in STEP21. If C/DONE<N, then the failure detecting device 22 sets the set time of the offset timer to a predetermined time Δt (see FIG. 4) in STEP22. Thereafter, the failure detecting process shown in FIG. 3 is ended. At this time, the failure detecting device 22 and the ECU 21 are turned off. Therefore, after elapse of the predetermined time Δt, the off timer is actuated to activate the failure detecting device 22 and the ECU 21, and the failure detecting device 22 executes the failure detecting process shown in FIG. 3. In the present embodiment, the predetermined time Δt is set to a time, e.g., 30 minutes, shorter than the predetermined period of time t/min (two hours in the present embodiment) which determines the time for initially executing the failure detecting process shown in FIG. 3. However, the predetermined time Δt may be the same as or longer than the predetermined period of time t/min. When the internal combustion engine 1 is shut off, the count parameter C/DONE is initialized to "0". While the internal combustion engine 1 is being shut off, the count parameter C/DONE is stored in the nonvolatile memory such as an EEPROM or the like.

If C/DONE≧N in STEP21, i.e., if the engine temperature TW is not converged to the atmospheric temperature TA when the failure detecting process shown in FIG. 3 is carried out as many times as the upper limit value N, then the failure detecting device 22 regards this condition as inappropriate for detecting whether or not the humidity sensor 18 has failed, and sets the detected result parameter SK to "1" in STEP19. Thereafter, the failure detecting process shown in FIG. 3 is ended. The upper limit value N is set such that the period of time that elapses from the shutdown of the internal combustion engine 1 to the time when the failure detecting process is carried out in an Nth cycle terminates short of the time when the steady humidity period Δtpx is finished, i.e., is equal to or shorter than the period t/max in FIG. 4.

When the operation of the internal combustion engine 1 is resumed after it is detected whether or not the humidity sensor 18 has failed during the shutdown of the internal combustion engine 1, the failure detecting device 22 operates the failure indicator 23 depending on the value of the detected result parameter SK. Specifically, if the value of the detected result parameter SK is "2", i.e., if it is judged that the humidity sensor 18 has failed to operate, then the failure indicator 20 indicates the failure of the humidity sensor 18. In the present embodiment, the failure detecting device 22 evaluates the deteriorated state (the degree of deterioration) of the HC adsorbent 7 by comparing the detected value of the relative humidity VHUM in the steady humidity period Δtpx, e.g., the detected value of the relative humidity VHUM to be compared with the upper limit level JUDH and the lower limit level JUDL in STEP16, with a threshold set depending on the engine temperature TW.

According to the above process, when the predetermined period of time t/min has elapsed after the internal combustion engine 1 is shut off, if the engine temperature TW (and the temperature near the HC adsorbent 7) does not drop to a temperature substantially equal to the atmospheric temperature TA, then the failure detecting process shown in FIG. 3 is subsequently carried out in each predetermined time Δt until the engine temperature TW drops to a temperature substantially equal to the atmospheric temperature TA.

According to the present embodiment, therefore, subsequently to the time when the predetermined period of time t/min has elapsed after the internal combustion engine 1 is shut off, when the engine temperature TW drops to a temperature substantially equal to the atmospheric temperature TA, it is essentially detected whether the humidity sensor 18 has failed or not, and the detected result parameter SK is set. Inasmuch as the time t/max until the steady humidity period Δtpx in which the relative humidity VHUM is substantially constant is finished after the internal combustion engine 1 is shut off is relatively long (sufficiently longer than the predetermined period of time t/min), there is basically no situation where the engine temperature TW does not drop to a temperature substantially equal to the atmospheric temperature TA before the steady humidity period Δtpx expires. Therefore, the failure detecting process shown in FIG. 3 is reliable in detecting whether or not the humidity sensor 18 has failed using the detected value of the relative humidity VHUM within the steady humidity period Δtpx. Because the detected value of the relative humidity VHUM which is used to detect whether or not the humidity sensor 18 has failed is generated while the relative humidity VHUM is being substantially constant steadily, the detected value of the relative humidity VHUM can be obtained with accuracy. Thus, it can be detected highly reliably and accurately whether or not the humidity sensor 18 has failed or not based on the detected value of the relative humidity VHUM.

In the present embodiment, if the value of the flag F/HCPG is "1", i.e., if it is recognized that the release of the HC and the moisture adsorbed by the HC adsorbent 7 during the operation of the internal combustion engine 1 is completed, then it is essentially detected whether or not the humidity sensor 18 has failed based on the detected value of the relative humidity VHUM. Stated otherwise, it is detected whether or not the humidity sensor 18 has failed based on the detected value of the relative humidity VHUM while the HC adsorbent 7 has adsorbed a maximum amount of moisture which it can adsorb in the deteriorated state after the internal combustion engine 1 is shut off. In the present embodiment, furthermore, if the value of the flag F/MCND is "1", i.e., if the internal combustion engine 1 is sufficiently warmed up and the air-fuel mixture is stably combusted immediately before the internal combustion engine 1 is shut off, and also if the air-fuel ratio KACT of the internal combustion engine 1 has been kept close to the stoichiometric air-fuel ratio for the predetermined period of time, then it is essentially detected whether or not the humidity sensor 18 has failed based on the detected value of the relative humidity VHUM. Stated otherwise, if the exhaust gas present around the HC adsorbent 7 contains a sufficient amount of moisture and variations in the contained amount of moisture are small immediately after the internal combustion engine 1 is shut off, then it is detected whether or not the humidity sensor 18 has failed based on the detected value of the relative humidity VHUM within the steady humidity period Δtpx.

As a consequence, the detected value of the relative humidity VHUM used in detecting whether or not the humidity sensor 18 has failed is highly stable, and falls reliably in the range between the upper limit level JUDH and the lower limit level JUDL if the humidity sensor 18 is normal. Therefore, it can accurately be detected whether or not the humidity sensor 18 has failed, and the detected result is highly reliable.

A method of detecting a failure of a humidity sensor according to a second embodiment of the present invention will be described below with reference to FIG. 6. The apparatus to which the method according to the second embodiment is applied is identical in structure to the apparatus to which the method according to the first embodiment is applied. The method according to the second embodiment is different from the method according to the first embodiment with respect to a portion of the process carried out by the failure detecting device 22. Those parts and functions according to the second embodiment which are identical to those according to the first embodiment are denoted by identical figures and reference characters, and will not be described below.

In the second embodiment, the failure detecting device 22 operates in the same manner as the failure detecting device 22 according to the first embodiment while the internal combustion engine 1 is in operation. Therefore, the operation sequence shown in FIG. 2 is executed by the failure detecting device 22 while the internal combustion engine 1 is in operation.

In the second embodiment, when the operation of the internal combustion engine 1 is resumed after it is shut off, or more specifically, after the ECU 21 and the failure detecting device 22 are activated and immediately before cranking is done to start the internal combustion engine 1, the failure detecting device 22 detects whether or not the humidity sensor 18 has failed.

Figure 6:
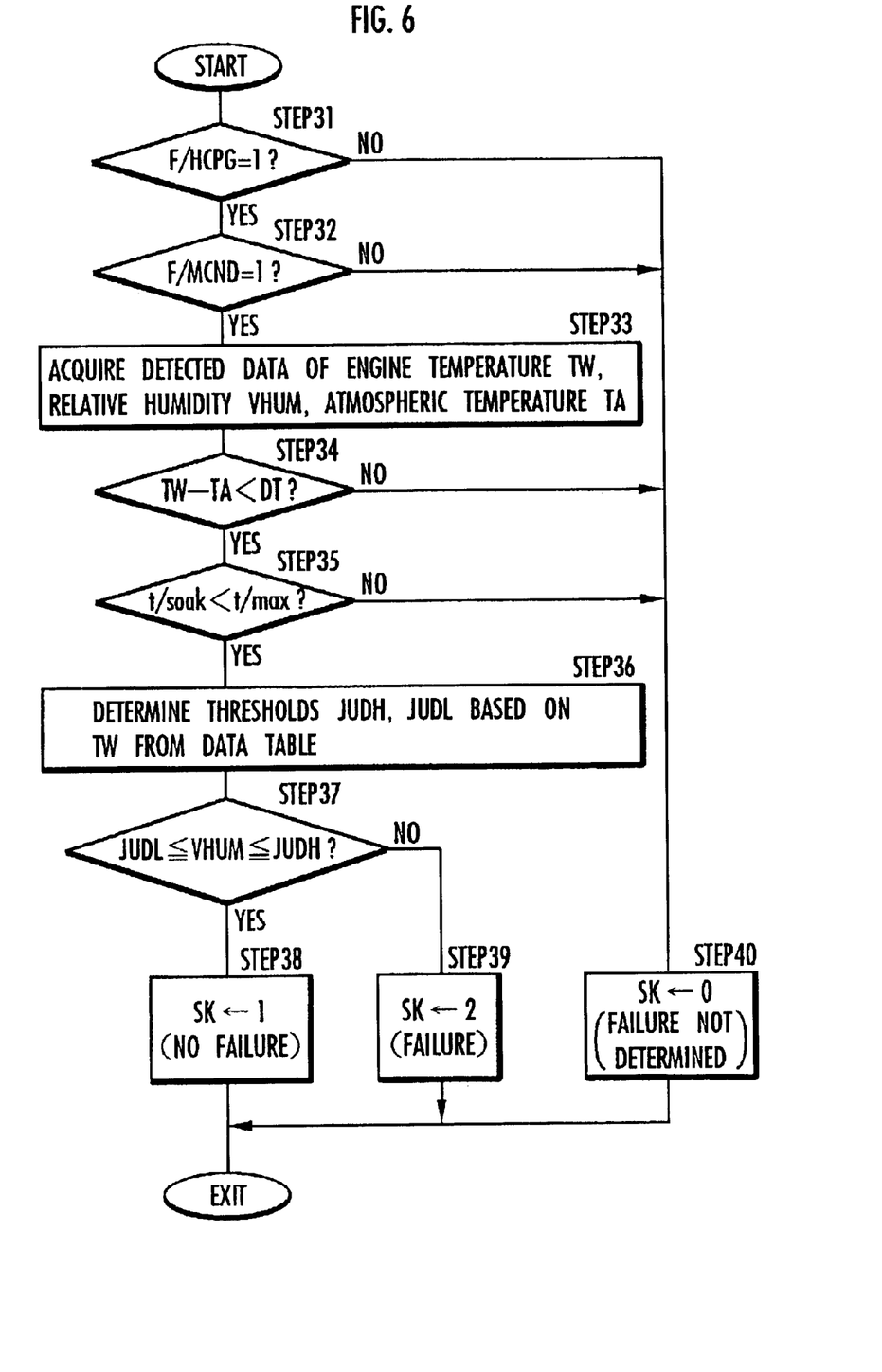
FIG. 6 is a flowchart of a method of detecting a failure of a humidity sensor according to a second embodiment of the present invention.

When the failure detecting device 22 is activated by turning on the operation switch of the internal combustion engine 1 after the internal combustion engine 1 is shut off, the failure detecting device 22 carries out an operation sequence (failure detecting process) shown in FIG. 6. As in STEP11, STEP12 shown in FIG. 3, the failure detecting device 22 judges the value of the flag F/HCPG and the value of the flag F/MCND respectively in STEP31, STEP32. If F/HCPG=0 or F/MCND=0, then the failure detecting device 22 assumes that it is difficult to appropriately detect whether or not the humidity sensor 18 has failed as with the first embodiment, and sets the detected result parameter SK to "0" in STEP40. Then, the failure detecting process shown in FIG. 6 is put to an end.

If F/HCPG=1 and F/MCND=1 in STEP31, STEP32, then the failure detecting device 22 acquires present detected value data of the engine temperature TW of the internal combustion engine 1, the relative humidity VHUM near the HC adsorbent 7, and the atmospheric temperature TA (the temperature outside of the exhaust system including the exhaust gas purifier 8, etc.) in STEP33, as with STEP13 shown in FIG. 3 according to the first embodiment.

The failure detecting device 22 determines whether the difference (TW−TA) between the present engine temperature TW and the atmospheric temperature TA is smaller than the predetermined value DT, i.e., whether or not the engine temperature TW and the temperature of the exhaust system including the exhaust gas purifier 8, etc. are substantially converged to the atmospheric temperature TA in STEP34, as with STEP14 shown in FIG. 3 according to the first embodiment.

If TW−TA≧DT, then failure detecting device 22 sets the detected result parameter SK to "0", making undetermined the detected result as to whether the humidity sensor 18 has failed or not in STEP40. Then, the failure detecting process shown in FIG. 6 is ended.

If TW−TA<DT, then the failure detecting device 22 determines whether an elapsed time t/soak after the internal combustion engine 1 is shut off has reached the period t/max which is determined as the time t/max (see FIG. 4) up to the end of the steady humidity period Δtpx or not (t/soak<t/max or not) in STEP35. The elapsed time t/soak is measured by a timer (not shown) which is activated when the internal combustion engine 1 is shut off. The time t/max up to the end of the steady humidity period Δtpx from the shutdown of the internal combustion engine 1 is experimentally determined in view of the arrangement of the exhaust system of the internal combustion engine 1, particularly the arrangement of the exhaust system downstream of the exhaust gas purifier 8, and is set to a period of time ranging from 24 hours to 72 hours, for example.

If t/soak≧t/max in STEP35, then the detected value of the relative humidity VHUM detected by the humidity sensor 21 is possibly converged, or being converged, to the ambient humidity. In this case, the failure detecting device 22 does not essentially detect whether or not the humidity sensor 18 has failed, but sets the detected result parameter SK to "0" in STEP40. Thereafter, the deterioration evaluating process shown in FIG. 6 is ended.

If t/soak<t/max in STEP35, then the failure detecting device 22 performs the same processing as STEP15, STEP16, STEP17, STEP18 shown in FIG. 3 according to the first embodiment respectively in STEP36, STEP37, STEP38, STEP39, for thereby essentially detecting whether or not the humidity sensor 18 has failed. Specifically, the failure detecting device 22 determines the upper limit level JUDH (upper limit threshold) and the lower limit level JUDL (lower limit threshold) based on the present detected value of the engine temperature TW acquired in STEP33 from the data table shown in FIG. 5 in STEP36. Then, the failure detecting device 22 compares the present detected value of the relative humidity VHUM acquired in STEP33 with the upper limit level JUDH and the lower limit level JUDL in STEP37. If JUDL≦VHUM≦JUDH, then the failure detecting device 22 judges that the humidity sensor 18 is normal, i.e., has not failed, and sets the detected result parameter SK to "1" in STEP38. Thereafter, the failure detecting process shown in FIG. 6 is put to an end. If VHUM<JUDL or VHUM>JUDH, then the failure detecting device 22 judges that the humidity sensor 18 suffers a failure, and sets the detected result parameter SK to "2" in STEP39. Thereafter, the failure detecting process shown in FIG. 6 is put to an end.

After it is detected whether the humidity sensor 18 has failed or not when the internal combustion engine 1 starts to operate, the failure detecting device 22 operates the failure indicator 20 depending on the value of the detected result parameter SK while the internal combustion engine 1 is in operation, as with the first embodiment. Specifically, when the detected result parameter SK is set to "2", indicating that the humidity sensor 18 suffers a failure, then the failure indicator 20 indicates the failure of the humidity sensor 18. In the present embodiment, as with the first embodiment, the failure detecting device 22 evaluates the deteriorated state (the degree of deterioration) of the HC adsorbent 7 by comparing the detected value of the relative humidity VHUM in the steady humidity period Δtpx with a threshold set depending on the engine temperature TW.

According to the above process, in the second embodiment, if the operation of the internal combustion engine 1 is resumed within a period (period Δtpx' in FIG. 4) from the time when the engine temperature TW (and the temperature of the exhaust gas purifier 8) has dropped to a temperature substantially equal to the atmospheric temperature TA until the elapsed time t/soak after the internal combustion engine 1 is shut off reaches the period t/max, then it is essentially detected whether or not the humidity sensor 18 has failed on the basis of the detected value of the relative humidity VHUM at the start of the operation of the internal combustion engine 1 (before the internal combustion engine 1 is activated). As with the first embodiment, it is detected whether or not the humidity sensor 18 has failed using the detected value of the relative humidity VHUM within the steady humidity period Δtpx in which the relative humidity VHUM is substantially constant for certain. Furthermore, as with the first embodiment, it is not essentially detected whether or not the humidity sensor 18 has failed if the value of the flag F/HCPG or F/MCND is "0", i.e., if the release of the HC and the moisture adsorbed by the HC adsorbent 7 is not completed while the internal combustion engine 1 is in operation, or if the air-fuel ratio KACT and the engine temperature TW immediately before the internal combustion engine 1 is shut off do not satisfy the given conditions. Therefore, as with the first embodiment, it can accurately be detected whether or not the humidity sensor 18 has failed.

In the first and second embodiments, the present invention has been described with respect to the system which returns the HC released from the HC adsorbent 7 during the operation of the internal combustion engine 1 to the intake pipe of the internal combustion engine 1, and combusts the returned HC in the internal combustion engine 1. However, the present invention is also applicable to a system in which the HC released from the HC adsorbent 7 is returned to an area upstream of the catalytic converter 6 which is positioned upstream of the HC adsorbent 7 to cause the catalytic converter 6 to purify the returned HC, or a system in which the HC released from the HC adsorbent 7 is returned to the catalytic converter 9 which is positioned downstream of the HC adsorbent 7 to cause the catalytic converter 9 to purify the returned HC.

In the first and second embodiments, the present invention has been described with respect to the system which has the HC adsorbent disposed independently in the exhaust system of the internal combustion engine 1. However, the present invention is also applicable to a system which has a humidity sensor disposed near a hydrocarbon adsorption catalyst which comprises a composite combination of an HC adsorbent and a catalyst such as a three-way catalyst. More specifically, the hydrocarbon adsorption catalyst comprises a honeycomb structure whose surface is coated with zeolite as an HC adsorbent and supports thereon a layer of precious metal such as platinum, palladium, rhodium, etc. as a constituent element of a three-way catalyst. Even if a humidity sensor is disposed in the vicinity of the above hydrocarbon adsorption catalyst, it is possible to detect whether or not a humidity sensor, which is provided to evaluate a deteriorated state of the hydrocarbon adsorbent of the hydrocarbon adsorption catalyst, has failed, as with the above embodiments.

Although certain preferred embodiments of the present invention have been shown and described in detail, it should be understood that various changes and modifications may be made therein without departing from the scope of the appended claims.

What is claimed is:

1. A method of detecting a failure of a humidity sensor in an exhaust system having a hydrocarbon adsorbent disposed in an exhaust passage of an internal combustion engine for adsorbing hydrocarbons contained in an exhaust gas emitted from the internal combustion engine, said humidity sensor being disposed in said exhaust passage for detecting a humidity in the exhaust passage near the hydrocarbon adsorbent, said method comprising the step of:

detecting whether or not said humidity sensor has failed based on an output signal of the humidity sensor within a predetermined period in which the output signal of the humidity sensor is substantially constant and a humidity represented by the output signal of the humidity sensor is not converged to a humidity outside of said exhaust passage, after said internal combustion engine is shut off.

2. A method according to claim 1, wherein said predetermined period comprises a period after elapse of a predetermined time at least after the internal combustion engine is shut off.

3. A method according to claim 1, wherein said predetermined period comprises a period after at least a temperature close to said hydrocarbon adsorbent is substantially equal to a temperature outside of said exhaust passage.

4. A method according to claim 1, wherein said predetermined period terminates when a predetermined time elapses after the internal combustion engine is shut off.

5. A method according to claim 1, wherein said step of detecting whether said humidity sensor has failed or not comprises the output signal of said humidity sensor acquired within said predetermined period with a threshold established depending on the temperature of said hydrocarbon adsorbent when data of the output signal of said humidity sensor is acquired.

6. A method according to claim 1, wherein said step of detecting whether or not said humidity sensor has failed based on the output signal of the humidity sensor is carried out after said internal combustion engine is shut off at least under predetermined operating conditions.

7. A method according to claim 6, wherein said predetermined operating conditions include a condition relative to an air-fuel ratio before said internal combustion engine is shut off, such that said step of detecting whether or not said humidity sensor has failed is carried out if the air-fuel ratio at least immediately before said internal combustion engine is shut off is kept at an air-fuel ratio close to a stoichiometric air-fuel ratio continuously for a predetermined period of time.

8. A method according to claim 6, wherein said predetermined operating conditions include a condition relative to a warmed-up state before said internal combustion engine is shut off, such that said step of detecting whether or not said humidity sensor has failed is carried out if an engine temperature at least immediately before said internal combustion engine is shut off is equal to or higher than a predetermined temperature.

* * * * *